Oct. 14, 1941.　　　　D. C. GRAY　　　　2,258,756
HYDRAULICALLY CONTROLLED BRAKE
Filed Oct. 26, 1940　　　2 Sheets-Sheet 2

INVENTOR
DONALD C. GRAY
BY G. H. Braddock
ATTORNEY

Patented Oct. 14, 1941

2,258,756

UNITED STATES PATENT OFFICE 2,258,756

HYDRAULICALLY CONTROLLED BRAKE

Donald C. Gray, Rose Township, Ramsey County, Minn., assignor to American Hoist & Derrick Company, St. Paul, Minn., a corporation of Delaware Application October 26, 1940, Serial No. 363,034

15 Claims. (Cl. 192—2)

This invention relates to an hydraulically controlled brake, and has more especial reference to an apparatus for controlling speed while paying out the line of an overhauling load on a hoist. Speaking generally, the apparatus includes hydraulically operated means adapted in cooperation with power producing mechanism for driving hoisting equipment to control the rate of speed of movement of an overhauling load being handled by said hoisting equipment.

An object of the invention is to provide an hydraulically controlled brake which will be of novel and improved construction.

A further object is to provide an improved load brake for hoists.

And a further object is to provide an apparatus for controlling speed while paying out the line of an overhauling load on a hoist wherein will be incorporated various improved features and characteristics of construction novel both as individual entities of the apparatus and in combination with each other.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification.

Figure 1:
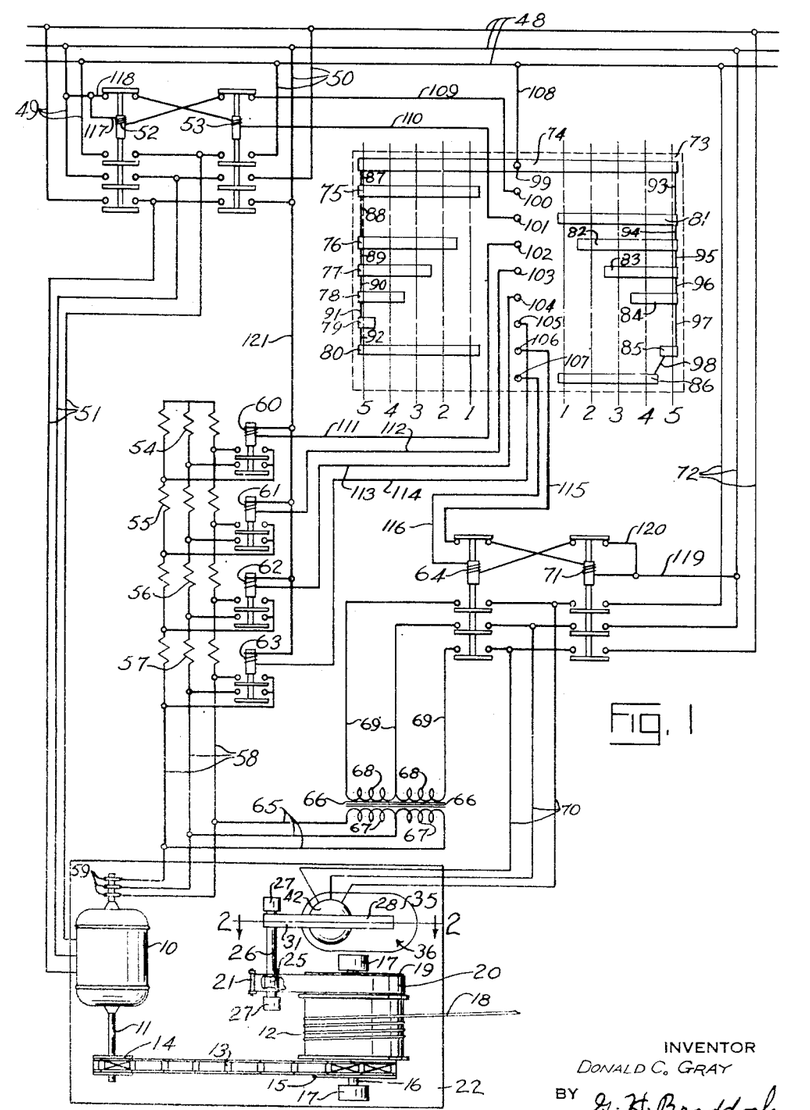
Fig. 1 is a diagrammatic view disclosing an apparatus in which the features and characteristics of the invention are incorporated.
Figure 2:
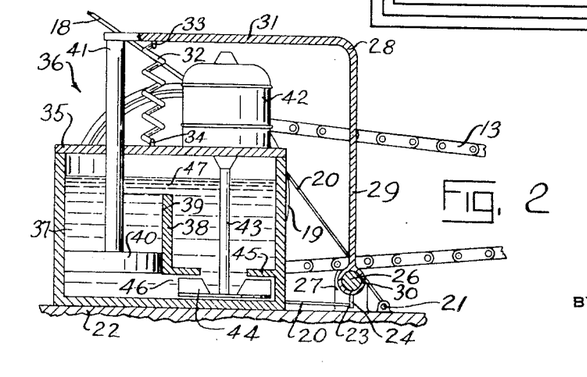
Fig. 2 is an enlarged sectional view, taken on line 2—2 in Fig. 1.

With respect to Figs. 1 and 2 of the drawings and the numerals of reference thereon, 10 indicates a main electric motor of the apparatus. Said motor 10 is an alternating current motor of the wound rotor induction type. The driven shaft 11 of the electric motor 10 is operatively connected to a winding drum 12 of a hoist through the medium of a sprocket chain 13 ridable upon a sprocket wheel 14 fixed upon said driven shaft 11 and upon a sprocket wheel 15 rigid with the winding drum 12. Said winding drum is mounted upon a horizontal shaft 16, and spaced apart bearings for the horizontal shaft 16 are denoted 17, 17. A usual hoist cable upon the drum 12 is represented 18.

A brake flange 19 rigid with the winding drum 12 is surrounded by a brake band 20 one end of which is secured, as at 21, to a bed plate 22 of the hoist. The other end of said brake band 20 is secured, as at 23, to a crank arm 24 itself fixed, as by a collar 25, to a second horizontal shaft 26, parallel with the horizontal shaft 16, rotatably supported in bearings 27, 27. All of the bearings 17, 17, 27, 27 are rigidly supported by the bed plate 22. The brake band 20 normally is biased to braking position against the brake flange 19 through the instrumentality of an L-lever 28, including a vertical arm 29 of said L-lever fixed as at 30 to the second horizontal shaft 26 and a horizontal arm 31 of the L-lever in spaced, substantially parallel relation to the bed plate 22, and a coil tension spring 32 having one of its ends secured, as at 33, to said horizontal arm 31 and its other end secured, as at 34, to a frame 35 rigid with said bed plate. More explicitly, the coil tension spring 32 has potential resiliency to urge the horizontal arm 31 of the L-lever 28 downwardly as disclosed in Fig. 2 and the vertical arm 29 of the said L-lever toward the left, thus to cause the horizontal shaft 26 to have tendency to rotate in direction to move the crank arm 24 toward the right in said Fig. 2.

An electro-hydraulically operated means, denoted generally at 36, is adapted to the purpose of causing the brake band 20 to be relieved, to greater or less extent, from braking position upon the brake flange 19 against the resilient action of the coil tension spring 32. Of the electro-hydraulically operated means 36, the before mentioned frame 35 constitutes a container for fluid 37, which desirably may be lubricating oil. A partition 38 in said container or frame 35 provides, together with a portion of the wall of the container or frame, a cylinder 39 slidably housing a piston 40 immersed in the fluid 37. A rod 41 rigid with said piston 40 passes upwardly through and is vertically slidable in the upper wall of the container or frame 35, and the upper end of said piston rod 41 is engaged against the outer end portion of the lower surface of the horizontal arm 31 of the L-lever 28. An auxiliary electric motor 42, which may be a three-phase squirrel cage induction motor, is rigidly supported upon the top surface of the container or frame 35, and a driven shaft 43 of said electric motor 42 passes downwardly through the upper wall of said container or frame 35 and rigidly supports an impeller 44 situated in a casing 45 at the bottom of the container or frame and to one side of the cylinder 39. The partition 38 is formed to provide a passage 46 from the exhaust of the impeller 44 and the casing 45 to the space of said cylinder 39 beneath the piston 40 and a passage 47 from the space of the cylinder above said piston 40 to the intake of said impeller and said casing 45.

In Figs. 1 and 2 of the drawings, the piston 40 of the electro-hydraulically operated means is positioned as when the auxiliary electric motor 42 is inoperative and the coil tension spring 32 is causing the brake band 20 to be tightly grasped against the brake flange 19. Upon energization of said electric motor 42 to drive the impeller 44, said impeller will cause pressure to be exerted against the lower surface of the piston 40 thus to cause said piston to be elevated in the cylinder 39. The extent of elevation of the piston 40 of course will depend upon the speed of rotation of the driven shaft 43 and the impeller 44, which is in turn dependent upon the torque applied at the electric motor 42 and the load to be overcome. Clearly, with elevation and lowering of said piston 40, together with the piston rod 41, the brake band 20 will be relieved from and applied to the brake flange 19 in corresponding amount.

Three supply lines, each denoted 48, from a source (not shown) of electrical energy are for supplying power to the main electric motor 10, and said supply lines 48 are adapted to be connected through conductors 49, 50 and 51, by means of reversing contactors 52 and 53, to the primary winding of said main electric motor 10. Closing of the contactor 52 is adapted to cause the main electric motor to be energized for rotation in direction to elevate a load upon the hoist cable 18, and closing of the contactor 53 is adapted to cause said main electric motor to be energized for rotation in direction to lower a load upon said hoist cable.

Different sets, denoted 54, 55, 56 and 57, respectively, of resistors are connected to the secondary windings of the main electric motor 10 through conductors 58 and ordinary slip rings 59. Contractors for separately cutting out each of the different sets of resistors 54, 55, 56 and 57 are indicated 60, 61, 62 and 63, respectively.

A control relay 64 is for connecting the conductors 58 to the auxiliary electric motor 42 of the electro-hydraulically operated means 36, through conductors 65, transformers 66 having primaries 67 and secondaries 68, conductors 69 and conductors 70, and a control relay 71 is for connecting the supply lines 48 to said auxiliary electric motor 42 through conductors 72 and said conductors 70.

A reversing type drum master switch, denoted 73, of the apparatus includes a common connector 74, a plurality of conducting segments 75, 76, 77, 78, 79 and 80, and a plurality of conducting segments 81, 82, 83, 84, 85 and 86. A conductor between the common connector 74 and the conducting segment 75 and conductors between the conducting segments 75 76, 77, 78, 79 and 80 are denoted 87, 88, 89, 90, 91 and 92, and a conductor between said common connector and the conducting segment 81 and conductors between the conducting segments 81 82, 83, 84, 85 and 86 are denoted 93, 94, 95, 96, 97 and 98. The master switch 73 also includes a plurality of fingers 99, 100, 101, 102, 103, 104, 105, 106 and 107.

A conductor 108 extends between the lower one of the supply lines 48 and the finger 99, and said finger 99 is at all times engaged with the common connector 74. A conductor 109 extends from the finger 100 to the normally closed interlocks of reversing contactor 52, and a conductor 117 extends from said reversing contactor 52 to the middle one of the conductors 49. A conductor 110 extends from the finger 101 to the reversing contactor 53, and a conductor 118 extends from the normally closed interlocks of said reversing contactor 53 to the middle one of said conductors 49. A conductor 111 extends between the finger 102 and the contactor 60, a conductor 112 extends between the finger 103 and the contactor 61, a conductor 113 extends between the finger 104 and the contactor 62, and a conductor 114 extends between the finger 105 and the contactor 63. A conductor 115 extends from the finger 106 to the normally closed interlocks of the relay 71, and a conductor 119 extends from said relay 71 to the middle one of the conductors 72. A conductor 116 extends from the finger 107 to the relay 64, and a conductor 120 extends from the normally closed interlocks of said relay 64 to the middle one of said conductors 72. A conductor 121 connects the middle conductor 50 with each of the contactors 60, 61, 62 and 63.

When the master switch 73 is in neutral position, as it is disclosed in Fig. 1 of the drawings, all of the reversing contactors 52 and 53, the contactors 60, 61, 62 and 63 for cutting out the different resistors, and the contactors of the relays 64 and 71 are in open position, the main electric motor 10 and the auxiliary electric motor 42 of the electro-hydraulically operated means are deenergized, thus to be at rest, and the brake band 20 is resiliently, tightly grasped against the brake flange 19 by the coil tension spring 32 to exert a braking effort against or upon said brake flange of sufficient magnitude to keep the winding drum from rotating even when under the influence of an overhauling load of maximum weight.

When said master switch is moved to the first hoisting position of the apparatus, the segment 75 becomes engaged with the finger 100, and the segment 80 becomes engaged with the finger 106. Engagement of said segment 75 with said finger 100 causes a circuit to be made through the reversing contactor 52, said circuit being traced from the lower supply line 48 through the conductor 108, the finger 99, the common connector 74, the conductor 87, the segment 75, the finger 100, the conductor 109, the interlocks of reversing contactor 52, said reversing contactor 52, the conductor 117 and the middle conductor 49 to the middle supply line 48. Closing of said contactor 52 causes the main electric motor 10 to be energized for rotation in direction to elevate a load upon the hoist cable 18, the circuit for the main electric motor being traced from the supply lines 48 through the conductors 49, the contactor 52 and the conductors 51 to the primary winding of said main motor. Engagement of said segment 80 with said finger 106 causes a circuit to be made through the control relay 71, said circuit being traced from the lower supply line 48 through the conductor 108, the finger 99, the common connector 74, the conductors 87, 88, 89, 90, 91 and 92 by way of the segments between these conductors, the segment 80, the finger 106, the conductor 115, the interlocks of control relay 71, said control relay 71, the conductor 119 and the middle conductor 72 to the middle supply line 48. Closing of the contactor of said control relay 71 causes the auxiliary electric motor 42 to be energized at full frequency, the circuit for the auxiliary electric motor being traced from the supply lines 48 through the conductors 72, the contactor of the control relay 71 and the conductors 70 to the primary winding of said auxiliary motor. The auxiliary electric motor 42, being energized at full frequency because connected with the supply lines 48, will run at normal speed and cause the impeller 44 to exert sufficient pressure against the lower surface of the piston 40 to cause the brake band 20 to be completely released from braking engagement with the brake flange 19, against the resilient action of the coil tension spring 32. The main electric motor 10 will commence operation with loosening of the brake band 20, and the secondary windings of said main motor evidently will include all of the sets of resistors 54, 55, 56 and 57 when the master switch is at the first hoisting position. The main electric motor of course will operate at its slowest hoisting speed when all of the resistors are included in the circuit of its secondary windings, and the actual speed of said motor will depend upon the magnitude of the load upon the hoist cable 18.

When the master switch is moved to the second hoisting position, the segment 75 remains engaged with the finger 100, the segment 80 remains engaged with the finger 106, and the segment 76 becomes engaged with the finger 102. Engagement of said segment 76 with said finger 102 causes a circuit to be made through the contactor 60, said circuit being traced from the lower supply line 48 through the conductor 108, the finger 99, the common connector 74, the conductors 87 and 88 by way of the segment 75 between these conductors, the segment 76, the finger 102, the conductor 111, said contactor 60 and the conductor 121 to the middle supply line 48. Closing of the contactor 60 causes the set of resistors 54 to be cut out of the circuit of the secondary windings of the main electric motor so that the speed of said main motor is increased.

When the master switch is moved to the third hoisting position, the segments 75, 76 and 80 remain engaged with the fingers 100, 102 and 106, respectively, and the segment 77 becomes engaged with the finger 103 to cause a circuit to be made through the contactor 61, said circuit being traced from the lower supply line 48 through 108, 99, 74, the conductors 87, 88 and 89 by way of the segments 75 and 76 between these conductors, the segment 77, the finger 103, the conductor 112, said contactor 61 and the conductor 121 to the middle supply line 48. Closing of the contactor 61 causes the set of resistors 55 to be cut out of the main motor circuit so that the speed of the main motor further is increased.

When the master switch is moved to the fourth hoisting position, the segments 75, 76, 77 and 80 remain engaged with the fingers 100, 102, 103 and 106, respectively, and the segment 78 becomes engaged with the finger 104 to make a circuit through the contactor 62, said circuit being traced substantially as stated in connection with the conductors 60 and 61, but through the segment 78, the finger 104, the conductor 113 and said contactor 62. Closing of the contactor 62 causes the set of resistors 56 to be cut out of the main motor circuit and the speed of the main motor still further to be increased.

When the master switch is moved to the fifth hoisting poistion, the segments 75, 76, 77, 78 and 80 remain engaged with the fingers 100, 102, 103, 104 and 106, respectively, and the segment 79 becomes engaged with the finger 105 to make a circuit through the contactor 63, said circuit being traced substantially as stated in connection with the contactors 60, 61 and 62, but through the segment 79, the finger 105, the conductor 114 and said contactor 63. Closing of the contactor 63 causes the set of resistors 57 to be cut out of the main motor circuit so that said main motor operates at its fastest hoisting speed.

Upon return of the master switch from the fifth hoisting position to neutral position, the contactors 63, 62, 61, 60 are de-energized in the reverse order of their energization, and the sets of resistors 57, 56, 55, 54 are placed back in the circuit of the secondary windings of the main motor in the reverse order in which said sets of resistors were cut out of said circuit. That is, the set of resistors 57 is first to be connected into the circuit of the main electric motor 10 upon return of the master switch from its fifth hoisting position toward its neutral position.

When the master switch is moved to the first lowering position of the apparatus, the segment 81 becomes engaged with the finger 101, and the segment 86 becomes engaged with the finger 107. Engagement of said segment 81 with said finger 101 causes a circuit to be made through the reversing contactor 53, said circuit being traced from the lower supply line 48 through the conductor 108, the finger 99, the common connector 74, the conductor 93, the segment 81, the finger 101, the conductor 110, the reversing contactor 53, the interlocks of said reversing contactor 53, the conductor 118 and the middle conductor 49 to the middle supply line 48. Closing of the contactor 53 causes the main electric motor 10 to be energized for rotation in direction to lower a load upon the hoist cable 18, the circuit for the main electric motor being traced from the supply lines 48 through the conductors 50, the contactor 53 and the conductors 51 to the primary winding of said main motor. Engagement of said segment 86 with said finger 107 causes a circuit to be made through the control relay 64, said circuit being traced from the lower supply line 48 through the conductor 108, the finger 99, the common connector 74, the conductors 93, 94, 95, 96, 97 and 98 by way of the segments between these conductors, the segment 86, the finger 107, the conductor 116, the control relay 64, the interlocks of said control relay 64, the conductor 120 and the middle conductor 72 to the middle supply line 48. Closing of the contactor of said control relay 64 causes a circuit to be completed through the auxiliary electric motor 42, said circuit being traced from the secondaries 68 of the transformers 66, having their primaries 67 connected to the conductors 58 by the conductors 65, through the conductors 69, the contactor of the control relay 64 and the conductors 70 to the primary winding of said auxiliary motor. It will be seen that the circuit completed through the auxiliary motor 42 by closing the control relay 64 includes the slip rings 59 connected to the secondary windings of the main electric motor 10. At the instant power is applied to the apparatus from the supply lines 48, the electrical system of said apparatus is at a standstill, and, therefore, the frequency at said slip rings 59 is that of the power supply from said lines 48. Consequently, said auxiliary motor 42 will accelerate and run at a frequency corresponding to power supply line frequency upon energization of said main electric motor. The auxiliary motor, being energized at a frequency corresponding to the frequency at the supply lines 48, will run at normal speed and cause the impeller 44 to exert sufficient pressure against the piston 40 to cause the brake band 20 to be completely released from braking engagement with the brake flange 19, against the resilient action of the coil tension spring 32, when the main motor is energized upon movement of the master switch to the first lowering position. The main electric motor 10 will commence operation with loosening of the brake band 20, and the secondary windings of said main motor will include all of the sets of resistors 54, 55, 56 and 57 when the master switch is at the first lowering position, so that the main motor will operate at its slowest lowering speed. As soon as the main electric motor commences to operate, the frequency at the slip rings 59 diminishes so that the net frequency at said slip rings is inversely proportional to the speed of said main motor in percent. of its synchronous speed. That is, the faster the main electric motor operates, the less is the frequency available at the secondary windings of said main motor and at the slip rings 59 to the purpose of causing the auxiliary electric motor 42 to be operated. Hence, the speed of operation of said auxiliary motor 42 will decrease with increase of the speed of operation of said main motor 10, and vice versa. Stated differently, the auxiliary electric motor 42 will operate at all times after the main electric motor is set in operation, while the contactor of the relay 64 is closed, at a speed which is inversely proportional to the speed of said main electric motor. The pressure output of the auxiliary electric motor 42 and the force exerted against the lower surface of the piston 40 of course will vary as the square of the speed of said auxiliary motor. Clearly, upon speeding up of the main motor 10 with consequent slowing down of the auxiliary motor 42, the extent of elevation of the piston 40 will be decreased, and upon slowing down of said main motor with consequent speeding up of said auxiliary motor, the extent of elevation of said piston 40 will be increased. Thus, the apparatus obviously is adapted to control speed while paying out the hoist cable 18 with an overhauling load supported upon said hoist cable, and the wide variation of the pressure output of the auxiliary electric motor 42 renders the brake of the apparatus self-regulating over a wide range of load conditions. Actually, overhauling loads can be lowered by the present apparatus inch by inch.

When the master switch is moved to the second lowering position, the segment 81 remains engaged with the finger 101, the segment 86 remains engaged with the finger 107, and the segment 82 becomes engaged with the finger 102. Engagement of said segment 82 with said finger 102 causes a circuit to be made through the contactor 60, said circuit being traced substantially as when the segment 76 is engaged with the finger 102, but through the conductors 93 and 94 by way of the segment 81 between these conductors and said segment 82. Closing of said contactor 60 causes the set of resistors 54 to be cut out of the main motor circuit as hereinbefore set forth so that the speed of said main motor is increased to have tendency toward applying more force to drive an overhauling load upon the hoist cable 18 in downward direction against the resilient action of the coil tension spring 32 holding the brake band 20 to the brake flange 19, with the net result that a speed-load curve of higher value is produced.

When the master switch is moved to the third lowering position, the segments 81, 82 and 86 remain engaged with the fingers 101, 102 and 107, respectively, and the segment 83 becomes engaged with the finger 103 to cause a circuit to be made through the contactor 61, said circuit being traced substantially as when the segment 77 is engaged with the finger 103, but through the conductors 93, 94 and 95 by way of the segments between these conductors and said segment 83. Closing of the contactor 61 causes the set of resistors 55 to be cut out of the main motor circuit, as before set forth, so that the speed of the main motor further is increased to apply still more force toward driving an overhauling load with the net result that a speed-load curve of still higher value is produced.

When the master switch is moved to the fourth lowering position, the segments 81, 82, 83 and 86 remain engaged with the fingers 101, 102, 103 and 107, respectively, and the segment 84 becomes engaged with the finger 104 to make a circuit through the contactor 62, said circuit being traced substantially as when the segment 78 is engaged with the finger 104, but through the conductors 93, 94, 95 and 96 by way of the segments between these conductors and said segment 84. Closing of said contactor 62 causes the set of resistors 56 to be cut out of the main motor circuit, as before stated, so that the speed of the main motor still further is increased to apply yet still more force toward driving an overhauling load with the net result that a speed-load curve of yet still higher value is produced.

Should the auxiliary electric motor 42 momentarily operate at greater speed than the frequency of the slip rings 59 calls for, there will be a self-braking action tending to slow down said auxiliary motor, whether the master switch is at the first, second, third or fourth lowering position, so that the auxiliary electric motor speed constantly will be practically synchronized with the frequency output of said slip rings 59.

When the master switch is moved to the fifth lowering position, the segments 81, 82, 83 and 84 remain engaged with the fingers 101, 102, 103 and 104, respectively, the segment 86 becomes removed from the finger 107, and the segment 85 becomes engaged with the finger 106. Attention is called to the fact that the set of resistors 57 desirably may be included in the circuit of the secondary windings of the main electric motor 10 when the master switch is in the fifth lowering position. Disengagement of the segment 86 from the finger 107 causes the circuit through the control relay 64, including said segment 86 and said finger 107, to be broken and the contactor of the control relay 64 to as a consequence move to open position thus to break the circuit through the auxiliary electric motor 42 including said mentioned contactor, as well as the secondaries 68 of the transformers 66. Engagement of said segment 85 with said finger 106 causes a circuit to be made through the control relay 71, said circuit being traced from the lower supply line 48 through the conductor 108, the finger 99, the common connector 74, the conductors 93, 94, 95, 96 and 97 by way of the segments between these conductors, the segment 85, the finger 106, the conductor 115, the interlocks of control relay 71, said control relay 71, the conductor 119 and the middle conductor 72 to the middle supply line 48. Closing of the contactor of said control relay 71 causes the auxiliary electric motor 42 to be connected directly in the circuit of the supply lines 48, as hereinbefore set forth, thus to be energized at full frequency. That is, movement of the master switch to the fifth lowering position causes the auxiliary electric motor to be disconnected from the circuit including the slip rings 59 and connected in the circuit of the power supply lines, so that when said master switch is at the fifth lowering position the auxiliary electric motor will run at normal speed and cause the impeller 44 to exert sufficient pressure against the piston 40 to cause the brake band 20 to be completely released from braking engagement with the brake flange 19, in opposition to the resilient action of the coil tension spring 32 tending to move said brake band into braking engagement with said brake flange. The auxiliary electric motor 42 immediately will speed up with release of the brake band 20 from the brake flange 19 due to movement of the master switch to the fifth lowering position to cause maximum force to be exerted against the lower surface of the piston 40. However, the speed of said auxiliary motor will be held to a proper value at slightly above synchronism with the speed of the main electric motor 10, when the contactor of the control relay 71 is caused to be closed by movement of the master switch to the fifth lowering position, while said main electric motor acts as a generator and the power of an overhauling or lowering load is transferred or returned to the power supply lines. The main electric motor 10 of course operates at its fastest lowering speed with no hindrance at all upon the load by the brake when the master switch is situated at the fifth lowering position.

Upon return of the master switch from the fifth lowering position to neutral position, the contactors 62, 61 and 60 are de-energized in the reverse order of their energization, and the sets of resistors 56, 55 and 54 are placed back in the circuit of the secondary windings of the main motor in the reverse of the order in which said sets of resistors were cut out of said circuit. Also, with movement of the master switch from the fifth lowering position to the fourth lowering position, the segment 85 is disengaged from the finger 106 to cause the control relay 71 to be de-energized and the auxiliary motor 42 thus to be disconnected from the power supply line circuit, and the segment 86 is engaged with the finger 107 to cause the control relay 64 to be energized and said auxiliary motor thus to be connected in the circuit of the secondaries 68 of the transformers 66. That is, whenever the master switch is at any one of the first, second, third or fourth lowering positions, the brake of the apparatus is hydraulically controlled in the manner as hereinbefore explained, and whenever said master switch is at the fifth lowering position, said brake is released.

The transformers 66 can be omitted and the conductors 69 connected to the conductors 65 in any instance where the auxiliary electric motor 42 is designed to perform its intended functions properly by reception of electrical energy directly from the secondary windings of the main electric motor 10, by way of slip rings such as the slip rings 59 disclosed.

Figure 3:
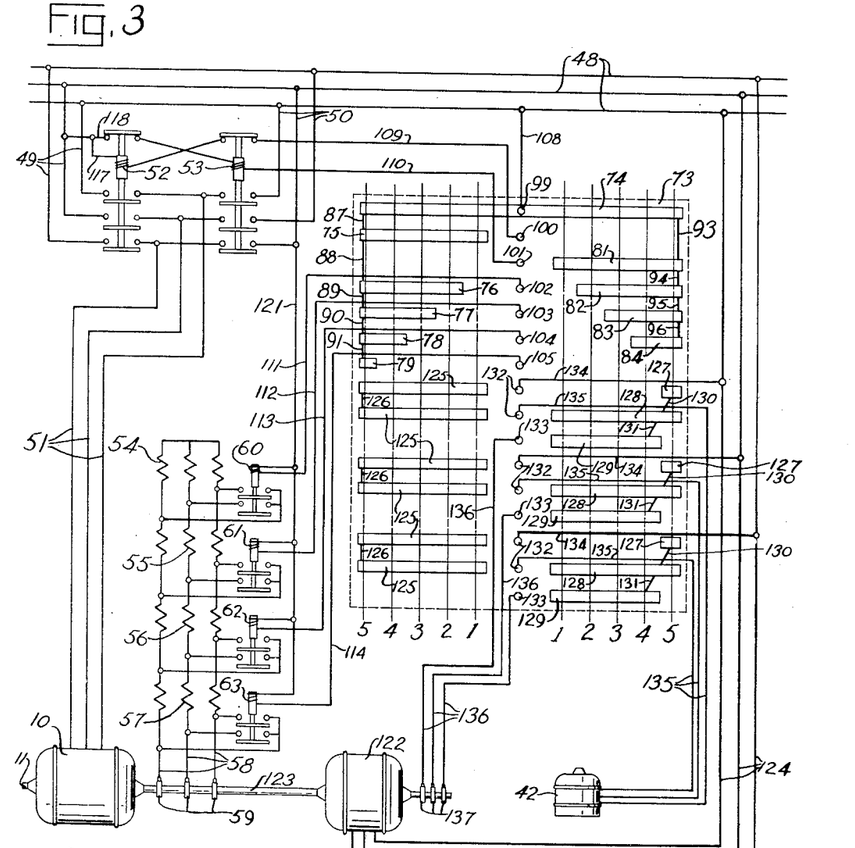
Fig. 3 is a diagrammatic view disclosing an apparatus, with parts omitted, of modified construction made according to the invention.

In Fig. 3 of the drawings there is disclosed an apparatus of modified construction made according to the invention. Parts in said Fig. 3 which are similar to parts disclosed in Fig. 1 and for the same purpose are given the same reference numerals.

The driven shaft 11 of the main electric motor 10 of Fig. 3 is operatively connected to a winding drum (not shown) of a hoist in the general manner as set forth in connection with the disclosure of Figs. 1 and 2, and said winding drum is equipped with a brake flange such as 19 surrounded by a brake band such as 20 adapted to be held to said brake flange by a coil tension spring such as 32.

Electro-hydraulically operated means, such as 36, is for the same purpose and may be of construction as before described, and includes as a part thereof the auxiliary electric motor 42.

An alternating current generator 122 is driven by an extension 123 of the main motor shaft 11 so that the speed of rotation of said generator will be responsive to the speed of rotation of the winding drum driven by said shaft 11. Said generator 122 is excited from the supply lines 48 through the medium of conductors 124 and is wound in such a way that when at a standstill its output has a maximum frequency and when in motion its output has a lower frequency.

The master switch 73 of Fig. 3 includes the common connector 74, the segments 75, 76, 77, 78, 79, 81, 82, 83 and 84, the conductors 87, 88, 89, 90 and 91 between the common connector 74 and the conducting segment 75 and between the conducting segments 75 to 79, the conductors 93, 94, 95 and 96 between the common connector 74 and the conducting segment 81 and between the conducting segments 81 to 84, and the fingers 99, 100, 101, 102, 103, 104 and 105. Also, said master switch includes three sets of segments each consisting of a pair of segments 125 connected by a conductor 126, three sets of segments each consisting of three segments 127, 128 and 129 connected by conductors 130 and 131, three separate sets of fingers each consisting of a pair of fingers 132, and three additional fingers each denoted 133.

Conductors 134 extend from the upper fingers of the different pairs of fingers 132 to the conductors 124, conductors 135 extend from the lower fingers of the different pairs of fingers 132 to the primary winding of the auxiliary electric motor 42, and conductors 136 connect the three fingers 133 to the generator 122 through slip rings 137.

The master switch is shown in Fig. 3 in neutral position. All of the reversing contactors 52 and 53 and the contactors 60, 61, 62 and 63 are in open position, and all of the segments are disengaged from all of the fingers, so that the main electric motor 10 and the auxiliary electric motor 42 are deenergized and at rest and the brake band employed will exert a braking effort of sufficient magnitude to maintain the winding drum of a hoist in stationary position under the influence of a maximum overhauling load.

When the master switch of said Fig. 3 is moved to the first hoisting position, the segment 75 becomes engaged with the finger 100, and the segments 125 become engaged with the fingers 132. Engagement of said segment 75 with said finger 100 causes a circuit to be made through the reversing contactor 52, and closing of said contactor 52 causes the main electric motor 10 to be energized for rotation in direction to elevate a load upon the hoist cable, in the manner as hereinbefore set forth. Engagement of said segments 125 with said fingers 132 causes the auxiliary electric motor 42 to be connected to the supply lines 48, thus to be energized at full frequency, the circuit for said auxiliary electric motor being traced from said supply lines 48 through the conductors 124, the conductors 134, the upper fingers of the different pairs of fingers 132, the upper segments of the different pairs of segments 125, the conductors 126, the lower segments of the different pairs of segments 125, the lower fingers of the different pairs of fingers 132, and the conductors 135 to the primary winding of said auxiliary motor. The auxiliary electric motor 42, being energized at full frequency because connected with the supply lines 48, will run at normal speed to cause the brake band to be completely released from braking engagement with the brake flange, in the manner as described in connection with Figs. 1 and 2, and the main electric motor 10 will start operation with loosening of said brake band. As aforesaid, all of the resistors will be in the circuit of said main motor when the master switch of the apparatus of Fig. 3 is at the first hoisting position.

When the master switch of said Fig. 3 is moved to the second hoisting position, the segment 75 remains engaged with the finger 100, the segments 125 remain engaged with the fingers 132, and the segment 76 becomes engaged with the finger 102. Engagement of said segment 76 with said finger 102 causes the contactor 60 to be closed and the set of resistors 54 to be cut out of the main motor circuit.

When the master switch of said Fig. 3 is moved to the third hoisting position, the segments 75 and 76 remain engaged with the fingers 100 and 102, respectively, the segments 125 remain engaged with the fingers 132, and the segment 77 becomes engaged with the finger 103. Engagement of said segment 77 with said finger 103 causes the contactor 61 to be closed thus to cut the set of resistors 55 out of the main motor circuit.

When the master switch of said Fig. 3 is moved to the fourth hoisting position, the segments 75, 76 and 77 remain engaged with the fingers 100, 102 and 103, respectively, the segments 125 remain engaged with the fingers 132, and the segment 78 becomes engaged with the finger 104. Engagement of said segment 78 with said finger 104 causes the contactor 62 to be closed thus to cut the set of resistors 56 out of the main motor circuit.

When the master switch of said Fig. 3 is moved to the fifth hoisting position, the segments 75, 76, 77 and 78 remain engaged with the fingers 100, 102, 103 and 104, respectively, the segments 125 remain engaged with the fingers 132, and the segment 79 becomes engaged with the finger 105. Engagement of said segment 79 with said finger 105 causes the contactor 63 to be closed thus to cut the set of resistors 57 out of the main motor circuit.

When the master switch of said Fig. 3 is moved to the first lowering position, the segment 81 becomes engaged with the finger 101, the segments 128 become engaged with the lower fingers of the different pairs of fingers 132, and the segments 129 become engaged with the fingers 133. Engagement of said segment 81 with said finger 101 causes a circuit to be made through the reversing contactor 53, and closing of said contactor 53 causes the main electric motor 10 to be energized for rotation in direction to lower a load upon the hoist cable, in the manner as hereinbefore set forth. Engagement of said segments 128 and 129 with the lower fingers of the pairs of fingers 132 and the fingers 133, respectively, causes a circuit to be completed through the auxiliary electric motor 42, said circuit being traced from the conductors 136 through the fingers 133, the segments 129, the conductors 131, the segments 128, the lower fingers of the pairs of fingers 132, and the conductors 135 to the primary winding of said auxiliary motor. That is, the circuit completed through the auxiliary motor 42 by engagement of the segments 128 and 129 with the lower fingers of the pairs of fingers 132 and the fingers 133, respectively, includes the slip rings 137 connected in the circuit of the alternating current generator 122. At the instant power is applied to the apparatus from the supply lines 48, the generator 122 is at a standstill so that its output has a maximum frequency, which frequency is substantially that of the power supply from said lines 48. Therefore, the auxiliary electric motor will accelerate and run at a frequency corresponding to power line frequency upon energization of said main electric motor to cause the brake to be completely released in the manner as hereinbefore made plain. The secondary windings of the main motor will include all of the sets of resistors when the master switch is at the first lowering position. As soon as said main electric motor commences to operate, the frequency at the slip rings 137 diminishes so that the net frequency at said slip rings 137 is inversely proportional to the speed of the winding drum driven by the main motor. That is, the faster the winding drum is operated, the less is the frequency available at the slip rings 137 to the purpose of causing the auxiliary electric motor to be operated. Consequently, the speed of said auxiliary motor will decrease with increase of the speed of rotation of the winding drum, and vice versa. The auxiliary electric motor will operate at all times after the main electric motor is set in operation, while said auxiliary motor is connected to the slip rings 137, at a speed which is inversely proportional to the speed of the winding drum, with the net result as stated in connection with Figs. 1 and 2.

When the master switch of said Fig. 3 is moved to the second lowering position, the segment 81 remains engaged with the finger 101, the segments 128 remain engaged with the lower fingers of the different pairs of fingers 132, the segments 129 remain engaged with the fingers 133, and the segment 82 becomes engaged with the finger 102. Engagement of said segment 82 with said finger 102 causes the contactor 60 to be closed thus to cut the set of resistors 54 out of the main motor circuit so that the speed of the main motor and the winding drum is increased, with the net result that a speed-load curve of higher value is produced.

When the master switch of said Fig. 3 is moved to the third lowering position, the segments 81 and 82 remain engaged with the fingers 101 and 102, respectively, the segments 128 and 129 remain engaged with the lower fingers of the different pairs of fingers 132 and the fingers 133, respectively, and the segment 83 becomes engaged with the finger 103. Engagement of said segment 83 with said finger 103 causes the contactor 61 to be closed thus to cut the set of resistors 55 out of the main motor circuit so that the speed of the main motor and the winding drum further is increased, with the net result that a speed-load curve of still higher value is produced.

When the master switch of said Fig. 3 is moved to the fourth lowering position, the segments 81, 82 and 83 remain engaged with the fingers 101, 102 and 103, respectively, the segments 128 and 129 remain engaged with the lower fingers of the different pairs of fingers 132 and 133, respectively, and the segment 84 becomes engaged with the finger 104. Engagement of said segment 84 with said finger 104 causes the contactor 62 to be closed thus to cut the set of resistors 56 out of the main motor circuit so that the speed of the main motor and the winding drum still further is increased, with the net result that a speed-load curve of yet still higher value is produced.

The auxiliary electric motor of the apparatus of Fig. 3 will be maintained practically synchronized with the frequency output of the slip rings 137 by reason of the fact that should said auxiliary motor momentarily operate at greater speed than said slip rings 137 call for, there will be a self-braking action tending to slow down the auxiliary motor.

When the master switch of said Fig. 3 is moved to the fifth lowering position, the segments 81, 82, 83 and 84 remain engaged with the fingers 101, 102, 103 and 104, respectively, the segments 128 remain engaged with the lower fingers of the different pairs of fingers 132, the segments 129 become removed from the fingers 133, and the segments 127 become engaged with the upper fingers of the different pairs of fingers 132. Desirably, the set of resistors 57 is included in the circuit of the main motor when the master switch of Fig. 3 is in the fifth lowering position. Disengagement of the segments 129 from the fingers 133 causes the circuit through the auxiliary motor including the slip rings 137 to be broken. Engagement of the segments 127 with the upper fingers of the different pairs of fingers 132 causes said auxiliary motor to be connected to the supply lines 48, thus to be energized at full frequency, the circuit for the auxiliary motor being traced from said supply lines through the conductors 124, the conductors 134, the upper fingers of the different pairs of fingers 132, the segments 127, the conductors 130, the segments 128, the lower fingers of the different pairs of fingers 132, and the conductors 135 to the primary winding of said auxiliary motor. It will be seen that when the master switch of Fig. 3 is at the fifth lowering position, the auxiliary motor will run at normal speed to cause the brake band to be completely released from braking engagement with the brake flange. Said auxiliary motor will speed up with release of the brake band upon movement of the master switch to the fifth lowering position, but the speed of the auxiliary motor will be held to a proper value in about the manner as explained in connection with Figs. 1 and 2. The main motor operates at its fastest lowering speed when the master switch of Fig. 3 is situated at the fifth lowering position. The resistors 62, 61 and 60 are de-energized in the reverse order of their energization when the master switch of Fig. 3 is returned from the fifth lowering position to neutral position. Whenever said master switch is at any one of the first, second, third or fourth lowering positions the brake is hydraulically controlled, and whenever the master switch is at the fifth lowering position the brake is released.

The conductors 136 could be connected to secondaries such as 68 of transformers such as 66 whose primaries such as 67 are connected to main motor slip rings such as 59, instead of being connected to the slip rings 137, and in any instance where the auxiliary electric motor employed was suitably designed, conductors such as 136 could be connected directly to main motor slip rings such as 59.

An apparatus according to the invention could include a mechanically actuated hydraulically operated means to the purpose of performing the functions of the electro-hydraulically operated means 36, with devices for causing a brake to be completely released, as by speeding up of the hydraulically operated means, when the master switch is moved to the fifth lowering position of said apparatus.

What is claimed is:

1. An apparatus for controlling speed while paying out the line of an overhauling load on a winding drum of a hoist, comprising a main electric motor for rotating said winding drum to drive said overhauling load in downward direction, means operatively connecting said main electric motor to said winding drum, a brake for the main electric motor and winding drum, means urging said brake toward braking position, a supply circuit for said main electric motor, a secondary circuit adapted to be energized through the medium of said supply circuit, hydraulically operated means including an auxiliary electric motor, means for connecting said main electric motor in said supply circuit thus to cause the main electric motor to drive said overhauling load in downward direction and for simultaneously connecting said auxiliary electric motor in said secondary circuit thus to cause said hydraulically operated means to be actuated at times while the main electric motor is driving said overhauling load in downward direction to permit the urging means to move the brake toward braking position with speeding up of the main electric motor and winding drum and to cause said brake to be moved away from braking position against the action of said urging means with slowing down of said main electric motor and winding drum, and means for causing said main electric motor to drive said overhauling load in downward direction at increased speed and for simultaneously disconnecting the auxiliary electric motor from said secondary circuit and connecting said auxiliary electric motor in said supply circuit thus to cause said hydraulically operated means to be actuated at other times while said main electric motor is driving said overhauling load in downward direction to cause said brake to be released from braking position against the action of said urging means.

2. An apparatus for controlling speed while paying out the line of an overhauling load on a winding drum of a hoist, comprising a main electric motor for rotating said winding drum to drive said overhauling load in downward direction, means operatively connecting said main electric motor to said winding drum, a brake for the main electric motor and winding drum, means urging said brake toward braking position, a supply circuit for said main electric motor, a secondary circuit for said main electric motor including slip rings, hydraulically operated means including an auxiliary electric motor, means for connecting said main electric motor in said supply circuit thus to cause the main electric motor to drive said overhauling load in downward direction and for simultaneously connecting said auxiliary electric motor in circuit with said slip rings thus to cause said hydraulically operated means to be actuated at times while the main electric motor is driving said overhauling load in downward direction to permit the urging means to move the brake toward braking position with speeding up of the main electric motor and winding drum and to cause said brake to be moved away from braking position against the action of said urging means with slowing down of said main electric motor and winding drum, and means for causing said main electric motor to drive said overhauling load in downward direction at increased speed and for simultaneously disconnecting said auxiliary electric motor from the circuit of said slip rings and connecting said auxiliary electric motor in said supply circuit thus to cause said hydraulically operated means to be actuated at other times while said main electric motor is driving said overhauling load in downward direction to cause said brake to be released from braking position against the action of said urging means.

3. An apparatus for controlling speed while paying out the line of an overhauling load on a winding drum of a hoist, comprising a main electric motor for rotating said winding drum to drive said overhauling load in downward direction, means operatively connecting said main electric motor to said winding drum, a brake for the main electric motor and winding drum, means urging said brake toward braking position, a supply circuit for said main electric motor, a generator excited from said supply circuit, hydraulically operated means including an auxiliary electric motor, means for connecting said main electric motor in said supply circuit thus to cause the main electric motor to drive said overhauling load in downward direction and for simultaneously connecting said auxiliary electric motor in circuit with said generator thus to cause said hydraulically operated means to be actuated at times while the main electric motor is driving said overhauling load in downward direction to permit the urging means to move the brake toward braking position with speeding up of the main electric motor and winding drum and to cause said brake to be moved away from braking position against the action of said urging means with slowing down of said main electric motor and winding drum, and means for causing said main electric motor to drive said overhauling load in downward direction at increased speed and for simultaneously disconnecting said auxiliary electric motor from the circuit of said generator and connecting said auxiliary electric motor in said supply circuit thus to cause said hydraulically operated means to be actuated at other times while said main electric motor is driving said overhauling load in downward direction to cause said brake to be released from braking position against the action of said urging means.

4. An apparatus for controlling speed while paying out the line of an overhauling load on a winding drum of a hoist, comprising an electric motor for rotating said winding drum to drive said overhauling load in downward direction, means operatively connecting said electric motor to said winding drum, a brake for the electric motor and winding drum, means urging said brake to braking position when said electric motor is stationary, and hydraulically operated means adapted to be actuated upon the setting of said electric motor into operation to cause said brake to be released from braking position against the action of said urging means, to be actuated at times while the electric motor is driving said overhauling load in downward direction to permit the urging means to move the brake toward braking position with speeding up of the electric motor and winding drum and to cause said brake to be moved away from braking position against the action of said urging means with slowing down of said electric motor and winding drum, and to be actuated at other times while said electric motor is driving said overhauling load in downward direction to cause said brake to be released from braking position against the action of said urging means.

5. An apparatus for controlling speed while paying out the line of an overhauling load on a winding drum of a hoist, comprising an electric motor for rotating said winding drum to drive said overhauling load in downward direction, means operatively connecting said electric motor to said winding drum, a brake for the electric motor and winding drum, means urging said brake to braking position when said electric motor is stationary, hydraulically operated means, means for causing said hydraulically operated means to be actuated upon the setting of said electric motor into operation to cause said brake to be released from braking position against the action of said urging means, and means adapted to be actuated at times while the electric motor is driving said overhauling load in downward direction to permit the urging means to move the brake toward braking position with speeding up of the electric motor and winding drum and to cause said brake to be moved away from braking position against the action of said urging means with slowing down of said electric motor and winding drum, said means for actuating said hydraulically operated means upon the setting of said electric motor into operation also being adapted to be actuated at other times while said electric motor is driving said overhauling load in downward direction to cause said brake to be released from braking position against the action of said urging means.

6. An apparatus for controlling speed while paying out the line of an overhauling load on a winding drum of a hoist, comprising a main electric motor for rotating said winding drum to drive said overhauling load in downward direction, means operatively connecting said main electric motor to said winding drum, a brake for the main electric motor and winding drum, means urging said brake to braking position when said main electric motor is stationary, hydraulically operated means, and an auxiliary electric motor constituted as a part of said hydraulically operated means adapted to be actuated upon the setting of said main electric motor into operation to cause said brake to be released from braking position against the action of said urging means, to be actuated at times while the main electric motor is driving said overhauling load in downward direction to permit the urging means to move the brake toward braking position with speeding up of the main electric motor and winding drum and to cause said brake to be moved away from braking position against the action of said urging means with slowing down of said main electric motor and winding drum, and to be actuated at other times while said main electric motor is driving said overhauling load in downward direction to cause said brake to be released from braking position against the action of said urging means.

7. An apparatus for controlling speed while paying out the line of an overhauling load on a winding drum of a hoist, comprising a main electric motor for rotating said winding drum to drive said overhauling load in downward direction, means operatively connecting said main electric motor to said winding drum, a brake for the main electric motor and winding drum, means urging said brake to braking position when said main electric motor is stationary, a supply circuit for said main electric motor, a secondary circuit adapted to be energized through the medium of said supply circuit, hydraulically operated means including an auxiliary electric motor, means for conecting said main electric motor in said supply circuit thus to cause the main electric motor to drive said overhauling load in downward direction and for simultaneously connecting said auxiliary electric motor in said secondary circuit thus to cause said hydraulically operated means to be actuated upon the setting of said main electric motor into operation to cause said brake to be released from braking position against the action of said urging means and to be actuated at times while the main electric motor is driving said overhauling load in downward direction after said main electric motor is set in operation to permit the urging means to move the brake toward braking position with speeding up of the main electric motor and winding drum and to cause said brake to be moved away from braking position against the action of said urging means with slowing down of said main electric motor and winding drum, and means for causing said main electric motor to drive said overhauling load in downward direction at increased speed and for simultaneously disconnecting the auxiliary electric motor from said secondary circuit and connecting said auxiliary electric motor in said supply circuit thus to cause said hydraulically operated means to be actuated at other times while said main electric motor is driving said overhauling load in downward direction to cause said brake to be released from braking position against the action of said urging means.

8. An apparatus for controlling speed while paying out the line of an overhauling load on a winding drum of a hoist, comprising a main electric motor for rotating said winding drum to drive said overhauling load in downward direction, meas operatively connecting said main electric motor to said winding drum, a brake for the main electric motor and winding drum, means urging said brake to braking position when said main electric motor is stationary, a supply circuit for said main electric motor including slip rings, hydraulically operated means including an auxiliary electric motor, means for connecting said main electric motor in said supply circuit thus to cause the main electric motor to drive said overhauling load in downward direction and for simultaneously connecting said auxiliary electric motor in circuit with said slip rings thus to cause said hydraulically operated means to be actuated upon the setting of said main electric motor into operation to cause said brake to be released from braking position against the action of said urging means and to be actuated at times while the main electric motor is driving said overhauling load in downward direction after said main electric motor is set in operation to permit the urging means to move the brake toward braking position with speeding up of the main electric motor and winding drum and to cause said brake to be moved away from braking position against the action of said urging means with slowing down of said main electric motor and winding drum, and means for causing said main electric motor to drive said overhauling load in downward direction at increased speed and for simultaneously disconnecting said auxiliary electric motor from the circuit of said slip rings and connecting said auxiliary electric motor in said supply circuit thus to cause said hydraulically operated means to be actuated at other times while said main electric motor is driving said overhauling load in downward direction to cause said brake to be released from braking position against the action of said urging means.

9. An apparatus for controlling speed while paying out the line of an overhauling load on a winding drum of a hoist, comprising a main electric motor for rotating said winding drum to drive said overhauling load in downward direction, means operatively connecting said main electric motor with said winding drum, a brake for the main electric motor and winding drum, means urging said brake to braking position when said main electric motor is stationary, a supply circuit for said main electric motor, a generator excited from said supply circuit, hydraulically operated means including an auxiliary electric motor, means for connecting said main electric motor in said supply circuit thus to cause the main electric motor to drive said overhauling load in downward direction and for simultaneously connecting said auxiliary electric motor in circuit with said generator thus to cause said hydraulically operated means to be actuated upon the setting of said main electric motor into operation to cause said brake to be released from braking position against the action of said urging means and to be actuated at times while the main electric motor is driving said overhauling load in downward direction after said main electric motor is set in operation to permit the urging means to move the brake toward braking position with speeding up of the main electric motor and winding drum and to cause said brake to be moved away from braking position against the action of said urging means with slowing down of said main electric motor and winding drum, and means for causing said main electric motor to drive said overhauling load in downward direction at increased speed and for simultaneously disconnecting said auxiliary electric motor from the circuit of said generator and connecting said auxiliary electric motor in said supply circuit thus to cause said hydraulically operated means to be actuated at other times while said main electric motor is driving said overhauling load in downward direction to cause said brake to be released from braking position against the action of said urging means.

10. An apparatus for controlling speed while paying out the line of an overhauling load on a winding drum of a hoist, comprising an electric motor for rotating said winding drum to drive said overhauling load in downward direction, means operatively connecting said electric motor to said winding drum, a brake for the electric motor and winding drum, means urging said brake toward braking position, hydraulically operated means, means for actuating said hydraulically operated means while the electric motor is driving said overhauling load in downward direction to permit the urging means to move the brake toward braking position with speeding up of the electric motor and winding drum and to cause said brake to be moved away from braking position against the action of said urging means with slowing down of said electric motor and winding drum, means for causing said electric motor to drive said overhauling load in downward direction at an increased speed, and means for actuating said hydraulically operated means while said electric motor is driving said overhauling load downwardly at said increased speed to cause said brake to be completely released from braking position against the action of said urging means.

11. An apparatus for controlling speed while paying out the line of an overhauling load on a winding drum of a hoist, comprising an electric motor for rotating said winding drum to drive said overhauling load in downward direction, means operatively connecting said electric motor to said winding drum, a brake for the electric motor and winding drum, means urging said brake toward braking position, electro-hydraulically operated means, means for actuating said electro-hydraulically operated means at times while the electric motor is driving said overhauling load in downward direction to permit the urging means progressively to move the brake toward braking position with speeding up of the electric motor and winding drum and to cause said brake progressively to be moved away from braking position against the action of said urging means with slowing down of said electric motor and winding drum, means for causing said electric motor to drive said overhauling load in downward direction at an increased speed, and means for actuating said electro-hydraulically operated means while said electric motor is driving said overhauling load downwardly at said increased speed to cause said brake to be released from braking position against the action of said urging means.

12. An apparatus for controlling speed while paying out the line of an overhauling load on a winding drum of a hoist, comprising a main electric motor for rotating said winding drum to drive said overhauling load in downward direction, means operatively connecting said main electric motor to said winding drum, a brake for the main electric motor and winding drum, means urging said brake toward a braking position, hydraulically operated means, an auxiliary electric motor constituted as a part of said hydraulically operated means adapted to be actuated at times while the main electric motor is driving said overhauling load in downward direction to permit the urging means to move the brake toward braking position with speeding up of the main electric motor and winding drum and to cause said brake to be moved away from braking position against the action of said urging means with slowing down of said main electric motor and winding drum, and means for causing said main electric motor to drive said overhauling load in downward direction at an increased speed, said auxiliary electric motor being adapted to be actuated at times while said main electric motor is driving said overhauling load in downward direction at said increased speed to cause said brake to be released from braking position against the action of said urging means.

13. An apparatus for controlling speed while paying out the line of an overhauling load on a winding drum of a hoist, comprising an electric motor for rotating said winding drum to drive said overhauling load in downward direction, means operatively connecting said electric motor to said winding drum, a brake for the electric motor and winding drum, means urging said brake to braking position when said electric motor is stationary, hydraulically operated means adapted to be actuated upon the setting of said electric motor into operation to cause said brake to be released from braking position against the action of said urging means and to be actuated at times while the electric motor is driving said overhauling load in downward direction to permit the urging means to move the brake toward braking position with speeding up of the electric motor and winding drum and to cause said brake to be moved away from braking position against the action of said urging means with slowing down of said electric motor and winding drum, means for causing said electric motor to drive said overhauling load in downward direction at an increased speed, and means for actuating said hydraulically operated means while said electric motor is driving said overhauling load downwardly at said increased speed to cause said brake to be completely released from braking position against the action of said urging means.

14. An apparatus for controlling speed while paying out the line of an overhauling load on a winding drum of a hoist, comprising an electric motor for rotating said winding drum to drive said overhauling load in downward direction, means operatively connecting said electric motor to said winding drum, a brake for the electric motor and winding drum, means urging said brake to braking position when said electric motor is stationary, hydraulically operated means, means for causing said hydraulically operated means to be actuated upon the setting of said electric motor into operation to cause said brake to be released from braking position against the action of said urging means, means adapted to be actuated at times while the electric motor is driving said overhauling load in downward direction to permit the urging means to move the brake toward braking position with speeding up of the electric motor and winding drum and to cause said brake to be moved away from braking position against the action of said urging means with slowing down of said electric motor and winding drum, means for causing said electric motor to drive said overhauling load in downward direction at an increased speed, and means for actuating said hydraulically operated means while said electric motor is driving said overhauling load downwardly at said increased speed to cause said brake to be completely released from braking position against the action of said urging means.

15. An apparatus for controlling speed while paying out the line of an overhauling load on a winding drum of a hoist, comprising a main electric motor for rotating said winding drum to drive said overhauling load in downward direction, means operatively connecting said main electric motor to said winding drum, a brake for the main electric motor and winding drum, means urging said brake to braking position when said main electric motor is stationary, hydraulically operated means, an auxiliary electric motor constituted as a part of said hydraulically operated means adapted to be actuated upon the setting of said main electric motor into operation to cause said brake to be released from braking position against the action of said urging means and to be actuated at times while the main electric motor is driving said overhauling load in downward direction to permit the urging means to move the brake toward braking position with speeding up of the main electric motor and winding drum and to cause said brake to be moved away from braking position against the action of said urging means with slowing down of said main electric motor and winding drum, and means for causing said main electric motor to drive said ovehauling load in downward direction at an increased speed, said auxiliary electric motor being adapted to be actuated at times while said main electric motor is driving said overhauling load in downward direction at said increased speed to cause said brake to be released from braking position against the action of said urging means.

DONALD C. GRAY.